United States Patent [19]

Moss et al.

[11] 3,941,314

[45] Mar. 2, 1976

[54] NOZZLE ASSEMBLY FOR DISTRIBUTING FLUID

[75] Inventors: Gerald Moss, Oxford, England; James Howard Taylor, Baton Rouge, La.

[73] Assignee: The United States of America as represented by the Administrator of Environmental Protection Agency, Washington, D.C.

[22] Filed: Dec. 26, 1973

[21] Appl. No.: 427,864

[52] U.S. Cl. ........... 239/553.3; 239/590.3; 239/559
[51] Int. Cl.² .......................................... B05B 1/14
[58] Field of Search ........... 239/491, 542, 548, 553, 239/553.3, 553.5, 559, 567, 590, 590.3; 181/60

[56] References Cited
UNITED STATES PATENTS

| 1,250,303 | 12/1917 | Greenawalt | 239/542 UX |
|---|---|---|---|
| 2,161,235 | 6/1939 | Schlagintweit | 239/553.3 X |
| 2,692,166 | 10/1954 | Fournier et al. | 239/559 |
| 3,034,222 | 5/1962 | Municio | 239/590.3 X |
| 3,404,845 | 10/1968 | Schmeling et al. | 239/553.5 X |
| 3,479,146 | 11/1969 | Hochman et al. | 239/553.5 X |
| 3,601,320 | 8/1971 | Du Plessis | 239/553.3 X |
| 3,685,971 | 8/1972 | Carson | 239/590.3 X |

FOREIGN PATENTS OR APPLICATIONS

| 145,592 | 6/1954 | Sweden | 239/548 |

*Primary Examiner*—Robert S. Ward, Jr.

[57] ABSTRACT

A nozzle for uniformly distributing fluid from a high velocity and high pressure zone to a lower pressure and a relatively low velocity zone which comprises: an inner wall member that contains a plurality of orifices that communicate with an outer wall member containing a plurality of orifices, which are laterally offset from the orifices of the inner wall. The fluid is passing from the high pressure zone to the low pressure zone must impinge upon the outer wall and/or interact with the fluid in the area between the inner and outer walls to dissipate the energy from the fluid, in order to produce the lower velocity and pressure of the existing fluid.

4 Claims, 1 Drawing Figure

U.S. Patent   March 2, 1976   3,941,314
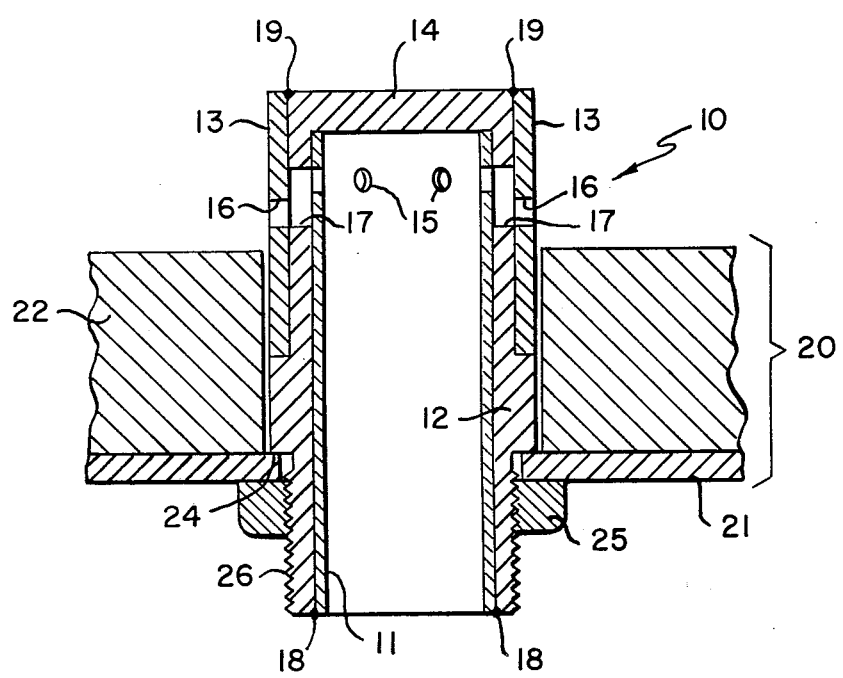

NOZZLE ASSEMBLY FOR DISTRIBUTING FLUID

The present invention relates to a nozzle assembly for distributing fluid, and to a vessel equipped with a fluid distributor comprising such nozzles for distributing fluid into the vessel.

A common requirement for a distributor for distributing a fluid into a vessel which is to contain a bed of fluidizable solid particles is that it should distribute the fluid as evenly as possible into the vessel. To do this, it is conventional to ensure that the pressure drop across the distributor is a substantial proportion of the pressure drop through the bed of fluidizable particles: the pressure drop across the distributor may thus be about one-third of the pressure drop through the bed. A common means of ensuring that the pressure drop across the distributor is adequately high is to employ as the distributor a perforated distributor plate, and although such a distributor functions suitably for many uses, the high velocity of fluid passing through the perforations in the distributor can be distinctly disadvantageous in certain applications. Thus, if the fluidizable particles are comprised of soft or otherwise relatively easily abradable or attritable particulate material which is to be contacted with the fluid passing through the distributor, the high fluid velocity in the vicinity of the perforations can cause rapid attrition of the particles, and expensive and/or elaborate apparatus may be required to separate the resulting fines from the fluid after the fluid has passed through the particulate material. A particular, but only illustrative example of the contacting of a relatively soft particulate material with a fluid is in the partial combustion of a sulphur-containing fuel in a bed of lime particles, as described in British Patent No. 1,183,937. In that partial combustion process, the lime particles are fluidized in air or other oxygen-containing gas which is employed for the partial combustion of the fuel at 800° C to 1100°C to produce, e.g. a sulphur-free fuel gas which may be subsequently burned in a boiler or gas turbine. The generation of fines in the bed of lime particles necessitates the provision of cyclones operating at high temperatures to remove fines from the fuel gas before it is supplied to the boiler or turbine.

It is an object of the present invention to provide means capable of distributing fluid with a required pressure drop across the distributing means, but which enables the fluid to be distributed at relatively low velocities.

The present invention comprises a nozzle for distributing a fluid comprising means providing a combination of two orifices which together provide a required pressure drop across the nozzle, there being an upstream metering orifice for the passage of fluid into the nozzle and a downstream discharge orifice for the distribution of fluid from the nozzle, the metering orifice being of such cross-sectional area and configuration that it provides a desired resistance to the flow of fluid therethrough, and the discharge orifice being of such cross-sectional area and configuration along its length that it causes fluid from the metering orifice to be discharged at substantially a desired velocity over substantially the whole of its cross-sectional area.

The cross-sectional area and configuration of both the metering and discharge orifices will depend on the pressure drop which is required through the nozzle to ensure that when a number of the nozzles are provided in a distributor, the fluid distribution from each nozzle will be the same or approximately the same as that from the other nozzles, and also that the velocity of discharge of fluid from the discharge orifices is acceptably high for the required fluid/particle contact, but not so high as to produce an unacceptably high proportion of fines.

FIG. 1 is a cross-sectional view of a nozzle assembly secured in a distributor plate.

The nozzle assembly 10 comprises a tube 11, an inner sleeve 12 surrounding the tube 11, and an outer sleeve 13 surrounding the upper part of the inner sleeve 12.

The inner sleeve 12 is so formed that its top provides a cap 14 which closes the top of the tube 11, and the latter is provided with a number of radially extending metering holes or orifices 15, the total area of which holes is such as to provide most of the resistance to fluid flow through the assembly 10. The outer sleeve 13 is provided with a number of radially extending distributing holes or orifices 16 whose combined area is such that the flow of fluid through the metering orifices 15 can be discharged from the distributing holes 16 at a speed which is acceptable from the point of view of avoiding high fluid velocities in the vicinity of the holes 16.

The metering holes 15 and distributing holes 16 are in different transverse planes, and the inner sleeve 12 is formed with a number of radial apertures 17 which provide a flow path from each metering hole 15 to, preferably, one respective distributing hole 16. The kinetic energy of fluid passing out of the metering holes 15 is degraded in the radial apertures 17 of the inner sleeve 12, e.g., by impact with the inner wall of the outer sleeve 13 and/or by interaction with fluid which has already so impacted, so that the fluid can pass out of the relatively larger area of the distributing holes 16 at a relatively low velocity.

The tube 11 is closely received in the inner sleeve 12 and maintained integral therewith by a weld 18. The outer sleeve 13 fits closely around a rebated upper part of the inner sleeve 12 and is maintained integral therewith by means of a weld 19.

As shown in the drawing, the nozzle assembly 10 is received in an aperture of a distributor plate 20 which has a mild steel or other metal base 21 supporting a refractory facing 22. The aperture through the refractory facing 22 is of slightly larger diameter than that through the metal base 21, and the assembly 10 is engaged against the upper side of the metal base 21 by a shoulder 24 provided on the inner sleeve 12 and against the lower side of the metal base 21 by a nut 25 which is received on threads 26 provided on a downwardly protruding part of the inner sleeve 12.

What we claim is:

1. A nozzle for distributing fluid from a higher pressure zone to a lower pressure zone at a relatively low velocity comprising: a first wall member having a plurality of fluid metering orifices, each metering orifice having an entrance for the ingress of fluid from the higher pressure zone; a second wall member having a plurality of fluid distributing orifices, each distributing orifice having an exit for the discharge of fluid to the lower pressure zone; and an intermediate means defining a plurality of apertures between the first and second wall members, said intermediate means and wall members being fixed relative to each other with contiguous regions of the wall members substantially parallel to each other and so arranged that each aperture of the intermediate means provides communication between one metering orifice and a single distributing orifice, each metering orifice being laterally offset relative to the distributing orifices with which it communicates, whereby, fluid passing from the higher pressure zone through the nozzle to the lower pressure zone will impinge on the second wall member and interact with the fluid in the apertures of the intermediate means to dissipate energy from the fluid.

2. A nozzle according to claim 1 in which the cross-sectional area of the distributing orifices is two to four times the cross-sectional area of the metering orifices.

3. A nozzle according to claim 2 in which the cross-sectional area of the distributing orifices is two and a quarter times the cross-sectional area of the metering orifices.

4. A nozzle according to claim 1 in which the wall members and the intermediate means are of cylindrical shape and concentric with each other.

* * * * *